United States Patent
He et al.

(10) Patent No.: US 7,864,743 B2
(45) Date of Patent: Jan. 4, 2011

(54) METHOD AND APPARATUS FOR IMPLEMENTING A UNIFORM PLATFORM FOR DATA/VOICE SERVICE

(75) Inventors: Bin He, Shanghai (CN); Songhai Wang, Shanghai (CN); Xiaowen Zhang, Shanghai (CN); Enyuan Qian, Shanghai (CN)

(73) Assignee: Alcatel Lucent, Shanghai (CN)

( * ) Notice: Subject to any disclaimer, the term of this patent is extended or adjusted under 35 U.S.C. 154(b) by 888 days.

(21) Appl. No.: 11/685,195

(22) Filed: Mar. 12, 2007

(65) Prior Publication Data

US 2007/0217380 A1    Sep. 20, 2007

(30) Foreign Application Priority Data

Mar. 20, 2006    (CN) .................. 2006 1 0024875

(51) Int. Cl.
*H04W 4/00*    (2009.01)
(52) U.S. Cl. ............... 370/338; 370/328; 370/422; 370/465
(58) Field of Classification Search .......... 370/311, 370/314, 325, 328, 329, 332, 333, 336, 337, 370/338, 347, 352, 353, 349, 411, 437, 465, 370/466, 468
See application file for complete search history.

(56) References Cited

U.S. PATENT DOCUMENTS

| | | | |
|---|---|---|---|
| 6,205,208 B1 * | 3/2001 | Detlefsen et al. | 379/93.05 |
| 6,459,708 B1 * | 10/2002 | Cox et al. | 370/537 |
| 7,269,181 B2 * | 9/2007 | Chun et al. | 370/422 |
| 2002/0147030 A1 | 10/2002 | Chun | |
| 2002/0159408 A1 * | 10/2002 | Sipola | 370/328 |
| 2003/0069010 A1 * | 4/2003 | Eravelli | 455/423 |
| 2003/0091065 A1 * | 5/2003 | Blorec et al. | 370/465 |

FOREIGN PATENT DOCUMENTS

WO    WO 99/49624 A1    9/1999

OTHER PUBLICATIONS

Musikka et al, "Ericsson's IP-Based BSS and radio Network Server", 2000, Ericsson Review, Ericsson, Stockholm, SE, pp. 224-233, XP002901766.
3rd Generation Partnership Project: 3G TS 22.060 V3.2.0 (Dec. 1999), XP002466333.
Alcatel, "Evolium Multi-BSS Fast Packet Server", Dec. 2001.

* cited by examiner

*Primary Examiner*—Kent Chang
*Assistant Examiner*—Dinh P Nguyen
(74) *Attorney, Agent, or Firm*—Fay Sharpe LLP

(57) ABSTRACT

Methods and apparatus are presented for implementing a uniform platform for data/voice service, in which a base station controller and a Multi-BSSFast Packet Server are integrated into one rack, and a base station controller is connected to the Multi-BSSFast Packet Server via a link based on E1 over Ethernet (E1oE).

15 Claims, 3 Drawing Sheets

METHOD AND APPARATUS FOR IMPLEMENTING A UNIFORM PLATFORM FOR DATA/VOICE SERVICE

CROSS-REFERENCE TO RELATED APPLICATIONS

This application is entitled to the benefit of Chinese Patent Application No. CN200610024875.0 filed on Mar. 20, 2006 with the Chinese Patent Office.

TECHNICAL FIELD

The present invention relates to Base Station Subsystem (BSS) of a Global System for Mobile communication (GSM)/General Packet Radio Service (GPRS) network, particularly to method and apparatus for implementing a uniform platform for data/voice service.

BACKGROUND ART

According to the specification of 3GPP TS 22.060, GPRS is introduced to a GSM network so that the $2^{nd}$ mobile communication system can provide data service while providing conventional voice service. Hence, the mobile communication system is upgraded from 2 G to 2.5 G.

Data service is implemented in a radio access BSS by introducing two processing units, that is, a Packet Control Unit (PCU) and a Channel Coding Unit (CCU).

Referring to FIG. 1, a GPRS BSS is comprised of a Base Transceiver Station (BTS) 2 having a number of CCUs 21, a Base Station Controller (BSC) 1 and a PCU 32 and mainly used for processing of packet data carrying service at a BSS side and management of packet radio channel resources, wherein for the BSC, external interfaces comprises an ABIS interface from the BTS, an Ater Circuit Switching (CS) interface from Mobile Switching Center (MSC) and an Ater Packet Switching (PS) interface from PCU. The BSC is connected to PCU by E1 lines (base cluster interface with rate of 2048 kbit/s)

In an existing mode of network, the BSC is completely separated from the PCU or the PCU processing unit is embedded into the network unit such as BSC.

With respect to the above field BSS system, in order to smoothly support GPRS service, an existing means for processing is to introduce a network unit—Multi-BSSFast Packet Server (MFS). Referring to FIG. 1, a MFS server 3 may include a plurality of PCU processing units 31, where the MFS is a structure with one or more telecom subracks, with each subrack accommodating multiple GPRS Processing Units (GPUs) or other types of Packet Control Units (PCUs). In one example, an MFS includes one or two precabled telecom racks, with each subrack accommodating up to 11 GPU type PCUs as for example known as an Evolium Multi-BSS Fast Packet Server.

However, it is one of interests of the applicant how to provide a more flexible scheme for system network.

CONTENT OF THE INVENTION

The present invention is directed to providing method and apparatus for implementing a uniform platform for data/voice service so that the system has opener and more compatible structure and more flexible network mode.

An apparatus for implementing a uniform platform for data/voice service provided in the present invention comprises a base station controller and a Multi-BSSFast Packet Server, characterized in that said base station controller and Multi-BSSFast Packet Server are integrated into one rack, and the base station controller is connected to the Multi-BSSFast Packet Server via a link based on E1 over Ethernet (E1oE).

In the above apparatus, the rack includes a plurality of sub-rack switches for providing IP switching function for the platform and an E1 termination shelf for providing external connection, and the plurality of sub-rack switches are divided into a first set and a second set connected with each other.

In the above apparatus, an operation and maintenance link via which the base station controller is connected to an external Operation Maintenance Center (OMC) is shared with the Multi-BSSFast Packet Server by routing of the sub-rack switches.

In the above apparatus, the base station controller includes an operation and maintenance control processing module, a transmission processing module and a plurality of conversation control processing modules connected across two sub-rack switches of the first set, wherein the operation and maintenance control processing module is used for receiving and processing information on the operation and maintenance link, the transmission processing module is used for processing and implementing transmission platform protocol and the conversation control processing modules are used for processing and implementing control platform protocol of GSM/GPRS.

In the above apparatus, the base station controller is further configured with two operation and maintenance control processing modules and transmission processing modules for redundant backup.

In the above apparatus, the Multi-BSSFast Packet Server includes an operation and maintenance control processing module and a plurality of packet control unit modules connected across two sub-rack switches of the second set.

In the above apparatus, the Multi-BSSFast Packet Server is further configured with an operation and maintenance control processing modules for redundant backup.

The present invention also provides a method for implementing a uniform platform for data/voice service, comprising:

integrating a base station controller and a Multi-BSSFast Packet Server into one rack; while, connecting the base station controller to the Multi-BSSFast Packet Server via a link based on E1oE to implement a uniform platform for data/voice service.

In the above method, the rack includes two sets of sub-rack switches for providing IP switching function for the platform and an E1 termination shelf for providing external connection shared between the base station controller and the Multi-BSSFast Packet Server.

In the above method, an operation and maintenance link connected to the base station controller arrives at the Multi-BSSFast Packet Server by routing of the sub-rack switches so that the operation and maintenance link is shared.

With the above technical solutions, i.e. technical solutions of data/voice uniform platform based on E1oE technique, network units can be smoothly transitioned from an independent network mode to a combined network mode so that the conventional technical solution that BSC can only implement Time Division Multiplexing (TDM) transmission in the system has been broken, which cause structure of the system opener and more compatible, but a separated network mode is smoothly transitioned to a combined network mode in which a rack and external E1 lines are shared between BSC and PCU as well. Meanwhile, expensive cost for using existing physical E1 lines is saved for a user and thus the cost will be decreased.

MODE OF CARRYING OUT THE INVENTION

The general idea of the present invention is:

A physical E1 line connection between existing network units BSC and PCU is replaced with E1oE technique. E1 frames are multiplexed onto Ethernet frames, and then the E1 frames are extracted from the Ethernet frames after the frames arrive at the receiving unit. Hence, expensive cost for using existing physical E1 lines is saved for a user and thus the cost will be decreased.

In the present invention, based on E1oE technique, the following two main functions are implemented in the uniform platform for data/voice service: one is to share a E1 termination shelf, the other is to share the O&M link.

Figure 1:
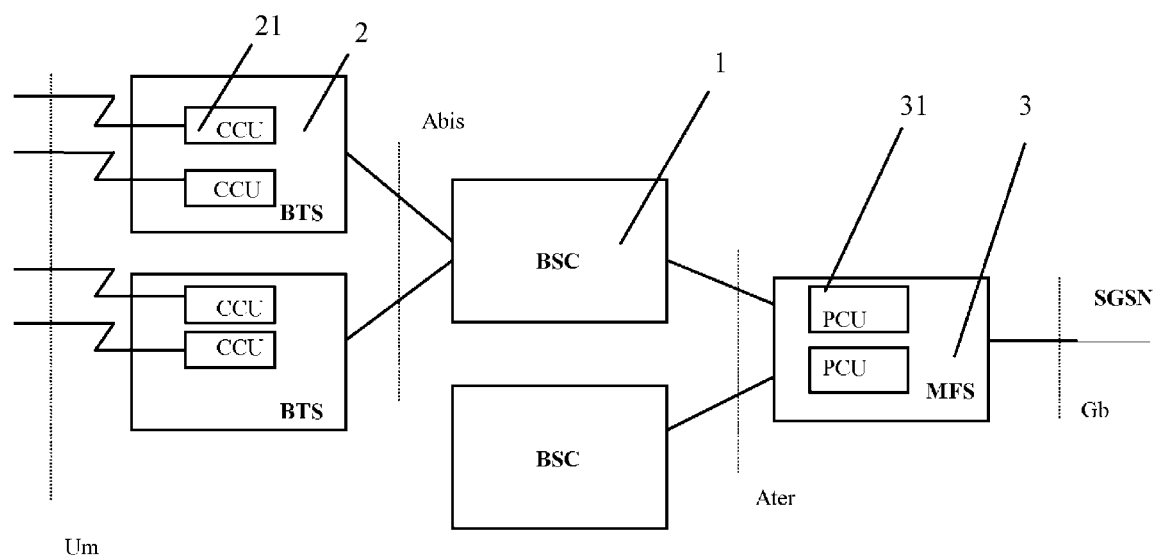
FIG. 1 is a schematic diagram showing structure of an existing BSS system.
Figure 2:
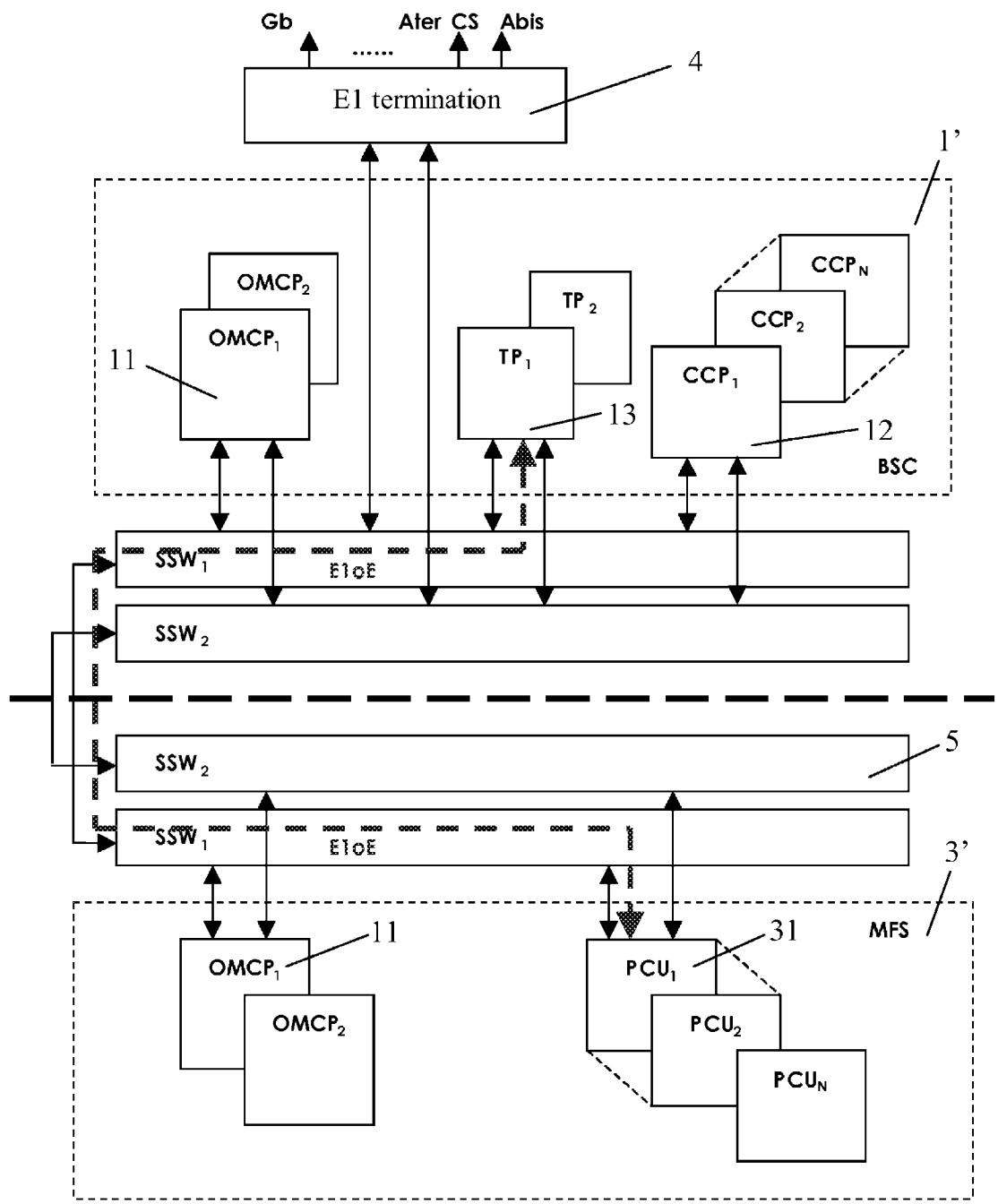
FIG. 2 is a schematic diagram showing an apparatus for implementing a uniform platform for data/voice service in accordance with the present invention.

As shown in FIG. 2, an apparatus for implementing a uniform platform for data/voice service provided in the present invention comprises a base station controller (BSC) 1' and a Multi-BSSFast Packet Server (MFS) 3'. The base station controller 1' and the Multi-BSSFast Packet Server 3' are integrated into one rack to form a uniform platform for data/voice service.

The rack includes four sub-rack switches (SSW) 5 for providing IP switching function for the platform and an E1 termination shelf 4 for providing external connection, and the four sub-rack switches 5 are divided into a first set and a second set connected with each other.

The base station controller 1' is connected to the Multi-BSSFast Packet Server 3' via a link based on E1 over Ethernet (E1oE).

The BSC 1' is comprised of three types of processing plates, i.e. operation and maintenance control processing (OMCP) 11, conversation control processing (CCP) 12 and transmission processing (TP) 13, wherein the OMCP has a function of receiving and processing information on the operation and maintenance link, the CCPs are used for processing and implementing control platform protocol of GSM/GPRS and the TP is used for processing and implementing transmission platform protocol and.

A BSC 1' includes two OMCPs 11, a plurality of CPPs 12 and two TPs 13.

The MFS 3' is comprised of two types of processing plates, i.e. OMCP 11 and PCU 31. An MFS 3' includes two OMCPs 11 and a plurality of PCU plates 31.

The BSC 1' and the MFS 3' share the E1 termination shelf 4, the external interfaces of which includes a Gb interface (between BSS and Serving GPRS Supporting Node (SGSN)) connected to an external SGSN, an Ater CS interface (between BSS and MSC) connected to an external MSC and an Abis interface (between BSC and BTS) connected to BTS. The E1 lines connected to the SGSN, Ater CS and Abis can be proportionally and flexibly configured as required by users.

Figure 3:
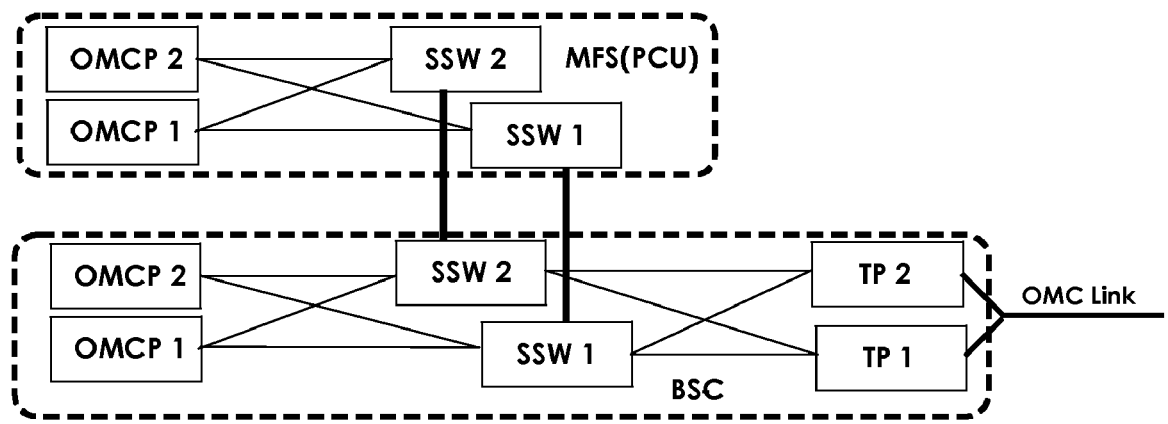
FIG. 3 is a schematic diagram showing Operation and Maintenance (O&M) links shared between BSC and PCU in accordance with the present invention.

As shown in FIG. 3, since IP-based transmission is used between BSC and PCU, an operation and maintenance (O&M) link via which the base station controller is connected to an external Operation Maintenance Center (OMC) is shared with the PCU in the MFS and the O&M link from the BSC can arrive at the PCU by routing of the sub-rack switches.

In order to enhance reliability of the system, a backup mode of 1+1 is used in the system so that when interruption occurs in one link, it may smoothly switch to the other link.

The present invention also provides a method for implementing a uniform platform for data/voice service, comprising:

integrating a base station controller and a Multi-BSSFast Packet Server into one rack; while, connecting the base station controller to the Multi-BSSFast Packet Server via a link based on E1oE to implement a uniform platform for data/voice service.

The above embodiments of the present invention have been presented by way of example only, and not limitation. It should be noted that various changes and modifications could be made by those skilled in the art herein without departing from the sprit and scope of the invention. Therefore, all equivalent technical solutions should belong to the scope of the present invention which should be limited by the attached claims.

The invention claimed is:

1. An apparatus for implementing a uniform platform for data/voice service, comprising:
    a base station controller; and
    a Multi-BSSFast Packet Server, wherein said base station controller and Multi-BSSFast Packet Server are integrated into one rack, and the base station controller is connected to the Multi-BSSFast Packet Server via a link based on E1 over Ethernet,
    wherein the rack includes a plurality of sub-rack switches for providing IP switching function for the platform and an E1 termination shelf for providing external connection, and the plurality of sub-rack switches are divided into a first set and a second set connected with each other;
    wherein an operation and maintenance link via which the base station controller is connected to an external Operation Maintenance Center is shared with the Multi-BSSFast Packet Server by routing of the sub-rack switches;
    wherein the base station controller includes:
        an operation and maintenance control processing module,
        a transmission processing module, and
        a plurality of conversation control processing modules connected across two sub-rack switches of the first set;
    wherein the operation and maintenance control processing module is used for receiving and processing information on the operation and maintenance link;
    wherein the transmission processing module is used for processing and implementing transmission platform protocol; and
    wherein the conversation control processing modules are used for processing and implementing control platform protocol of GSM/GPRS.

2. The apparatus according to claim 1, wherein the base station controller is further configured with two operation and maintenance control processing modules and transmission processing modules for redundant backup.

3. The apparatus according to claim 1, wherein the Multi-BSSFast Packet Server includes:

an operation and maintenance control processing module, and a plurality of packet control unit modules connected across two sub-rack switches of the second set.

4. The apparatus according to claim 3, wherein the Multi-BSSFast Packet Server is further configured with an operation and maintenance control processing modules for redundant backup.

5. A method for implementing a uniform platform for data/voice service, comprising:
integrating a base station controller and a Multi-BSSFast Packet Server into one rack; and
connecting the base station controller to the Multi-BSSFast Packet Server via a link based on E1oE to implement a uniform platform for data/voice service;
wherein the rack includes two sets of sub-rack switches for providing IP switching function for the platform and an E1 termination shelf for providing external connection shared between the base station controller and the Multi-BSSFast Packet Server; and
wherein an operation and maintenance link connected to the base station controller arrives at the Multi-BSSFast Packet Server by routing of the sub-rack switches so that the operation and maintenance link is shared.

6. An apparatus that implements a uniform platform for data/voice service, comprising:
a base station controller, the base station controller comprising at least one operation and maintenance control processing module for processing information received from an external Operation Maintenance Center via an operation and maintenance link; and
a network unit, the network unit comprising at least one operation and maintenance control processing module and a plurality of packet control unit modules;
where the base station controller is connected to the Network unit via a link based on E1 over Ethernet technique, wherein the E1 over Ethernet technique comprises means for multiplexing E1 frames into Ethernet frames and extracting the E1 frames from the Ethernet frames at the receiving unit;
where the base station controller and the network unit are integrated into one rack, the rack comprising a plurality of sub-rack switches for providing IP switching functions for the platform;
where the operation and maintenance link via which the base station controller is connected to the external Operation Maintenance Center is shared with the network unit by routing of the sub-rack switches, wherein the sub-rack switches are enabled for routing information received by the base station controller via the operation and maintenance link from the external Operation and Maintenance Center to the at least one operation and maintenance control processing module in the network unit.

7. The apparatus according to claim 6, wherein the rack includes an E1 termination shelf for providing external connection, and the plurality of sub-rack switches are divided into a first set and a second set connected with each other.

8. The apparatus according to claim 7, characterized in that the E1 termination shelf includes a Gb interface connected to an external Serving GPRS support node, an Ater CS interface connected to an external Mobile Switching Center and an Abis interface connected to a Base Station Transceiver.

9. The apparatus according to claim 7, wherein the base station controller includes a transmission processing module and a plurality of conversation control processing modules connected across two sub-rack switches of the first set, wherein the transmission processing module is used for processing and implementing transmission platform protocol, the conversation control processing modules are used for processing and implementing control platform protocol of GSM/GPRS.

10. The apparatus according to claim 9, wherein the base station controller is further configured with two operation and maintenance control processing modules and transmission processing modules for redundant backup.

11. The apparatus according to claim 7, wherein the Network unit includes a plurality of packet control unit modules connected across two sub-rack switches of the second set.

12. The apparatus according to claim 11, wherein the Network unit is further configured with an operation and maintenance control processing module for redundant backup.

13. A method for implementing a uniform platform for data/voice service, comprising:
integrating a base station controller and a Network unit into one rack;
connecting the base station controller to the Network unit via a link based on E1 over Ethernet technique, wherein the E1 over Ethernet technique enables for multiplexing E1 frames into Ethernet frames and extracting the E1 frames from the Ethernet frames at the receiving unit;
sharing an operation and maintenance link via which the base station controller is connected to an external Operation Maintenance Center with the network unit, wherein the base station controller comprises at least one operation and maintenance control processing module for processing information received from the external Operation Maintenance Center via the operation and maintenance link and wherein the network unit comprises at least one operation and maintenance control processing module for processing information received via the shared operation and maintenance link and a plurality of packet control unit modules; and
providing IP switching function for the platform rack by a plurality of sub-rack switches, wherein the sub-rack switches are enabled for routing information received by the base station controller via the operation and maintenance link from the external Operation and Maintenance Center to at least one operation and maintenance control processing module in the network unit.

14. The method according to claim 13, wherein the rack includes two sets of sub-rack switches for providing IP switching function for the platform and an E1 termination shelf for providing external connection shared between the base station controller and the Network unit.

15. The method according to claim 14, wherein the E1 termination shelf includes a Gb interface connected to an external Serving GPRS support node, an Ater CS interface connected to an external Mobile Switching Center and an Abis interface connected to a Base Station Transceiver and wherein implementing the uniform platform comprises configuring the E1 interfaces according to user requirements.

* * * * *